(12) United States Patent
Inaguma et al.

(10) Patent No.: US 7,581,618 B2
(45) Date of Patent: Sep. 1, 2009

(54) TRANSMISSION RATIO VARIABLE STEERING DEVICE

(75) Inventors: Yoshiharu Inaguma, Nagoya (JP); Susumu Honaga, Hoi-gun (JP)

(73) Assignee: JTEKT Corporation, Osaka-shi (JP)

( * ) Notice: Subject to any disclaimer, the term of this patent is extended or adjusted under 35 U.S.C. 154(b) by 245 days.

(21) Appl. No.: 11/570,803

(22) PCT Filed: Jun. 10, 2005

(86) PCT No.: PCT/JP2005/011084

§ 371 (c)(1),
(2), (4) Date: Dec. 18, 2006

(87) PCT Pub. No.: WO2006/003796

PCT Pub. Date: Jan. 12, 2006

(65) Prior Publication Data

US 2008/0023251 A1 Jan. 31, 2008

(30) Foreign Application Priority Data

Jul. 1, 2004 (JP) .............................. 2004-195297

(51) Int. Cl.
*B62D 5/04* (2006.01)
(52) U.S. Cl. ..................... 180/444; 474/339; 74/388 PS
(58) Field of Classification Search ................. 180/444, 180/400; 74/388 PS; 475/150, 338, 339
See application file for complete search history.

(56) References Cited

U.S. PATENT DOCUMENTS 3,831,701 A * 8/1974 Pilon et al. .................. 180/407
4,327,598 A * 5/1982 Yoneda et al. ................ 74/467
4,590,818 A * 5/1986 Teraoka ..................... 74/473.1
4,686,433 A * 8/1987 Shimizu ....................... 318/50
4,739,855 A * 4/1988 Miyoshi et al. ............. 180/422
4,770,062 A * 9/1988 Minegishi .................... 475/177
4,917,200 A * 4/1990 Lucius ........................ 180/6.2

(Continued)

FOREIGN PATENT DOCUMENTS

DE 195 19 588 A1 12/1995

(Continued)

*Primary Examiner*—Tony H. Winner
(74) *Attorney, Agent, or Firm*—Oblon, Spivak, McClelland, Maier & Neustadt, P.C.

(57) ABSTRACT

A transmission ratio variable mechanism in prior art provided on a steering column needs a spiral cable and hence, not only needs an extra space but is also accompanied by a risk of having a drawback such as the breakage of the cable or the like. A steering wheel shaft 11 and an output shaft 22 are supported in a housing 21 attached to a steering column 13, to be rotatable on the same axis; first and second sun gears 45, 46 different slightly in the number of gear teeth are formed on facing end portions of the steering wheel shaft and the output shaft; first and second planetary gears 53, 54 meshing with the first and second sun gears are supported on a carrier 47; and a worm shaft 58 meshing with a worm wheel 57 connected rotationally to the carrier is constructed to be rotatable by a motor 43 which is provided on the housing in a direction perpendicular to the rotational axis of the steering wheel shaft and the output shaft. Thus, it can be realized to eliminate any spiral cable and to obtain a transmission ratio variable steering device 10 which is space-saving.

2 Claims, 3 Drawing Sheets

U.S. PATENT DOCUMENTS

| | | | |
|---|---|---|---|
| 5,050,697 A * | 9/1991 | Umemura | 180/422 |
| 5,123,883 A * | 6/1992 | Fukaya | 475/178 |
| 5,333,700 A * | 8/1994 | Mouri | 180/444 |
| 5,423,391 A * | 6/1995 | Shimizu | 180/446 |
| 5,503,239 A | 4/1996 | Shimizu | |
| 6,041,885 A * | 3/2000 | Watanabe et al. | 180/444 |
| 6,179,083 B1 * | 1/2001 | Yamauchi | 180/444 |
| 6,575,265 B2 * | 6/2003 | Richardson et al. | 180/444 |
| 6,705,424 B2 * | 3/2004 | Ogawa et al. | 180/446 |
| 6,763,908 B2 * | 7/2004 | Ogawa et al. | 180/446 |
| 6,955,623 B2 * | 10/2005 | Pattok | 475/3 |
| 7,243,570 B2 * | 7/2007 | Kuehnhoefer et al. | 74/388 PS |

FOREIGN PATENT DOCUMENTS

| | | |
|---|---|---|
| DE | 101 59 800 A1 | 12/2002 |
| DE | 101 52 704 A1 | 7/2003 |
| GB | 2 275 032 A | 8/1994 |
| JP | 3 69572 | 7/1991 |
| JP | 2000 127985 | 5/2000 |
| JP | 2000127985 A * | 5/2000 |
| JP | 2003 237590 | 8/2003 |
| JP | 2003 312487 | 11/2003 |
| JP | 2004 34751 | 2/2004 |
| WO | WO 01/49553 A1 | 7/2001 |

* cited by examiner

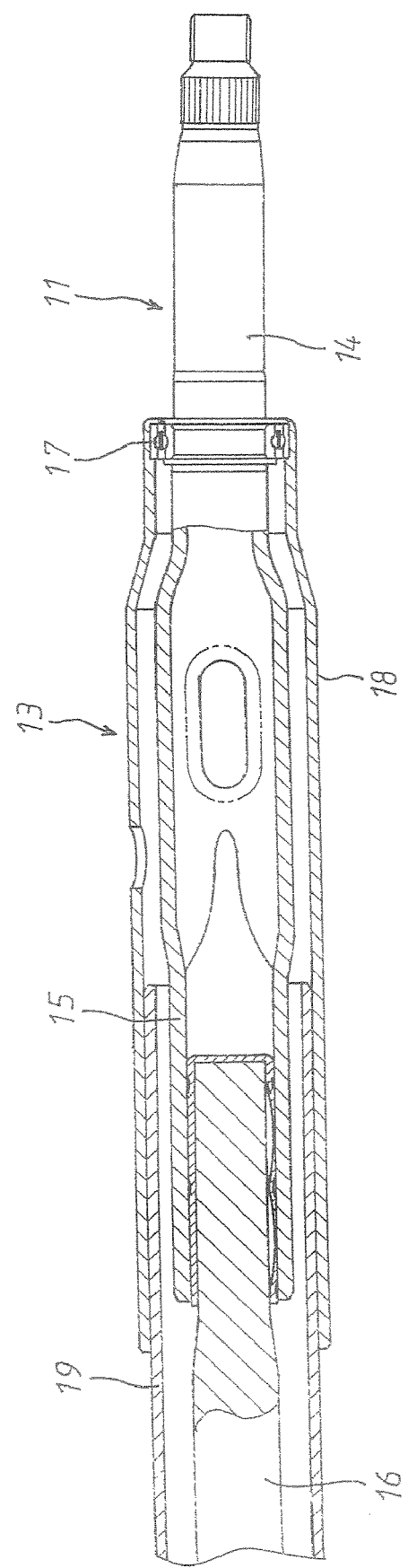

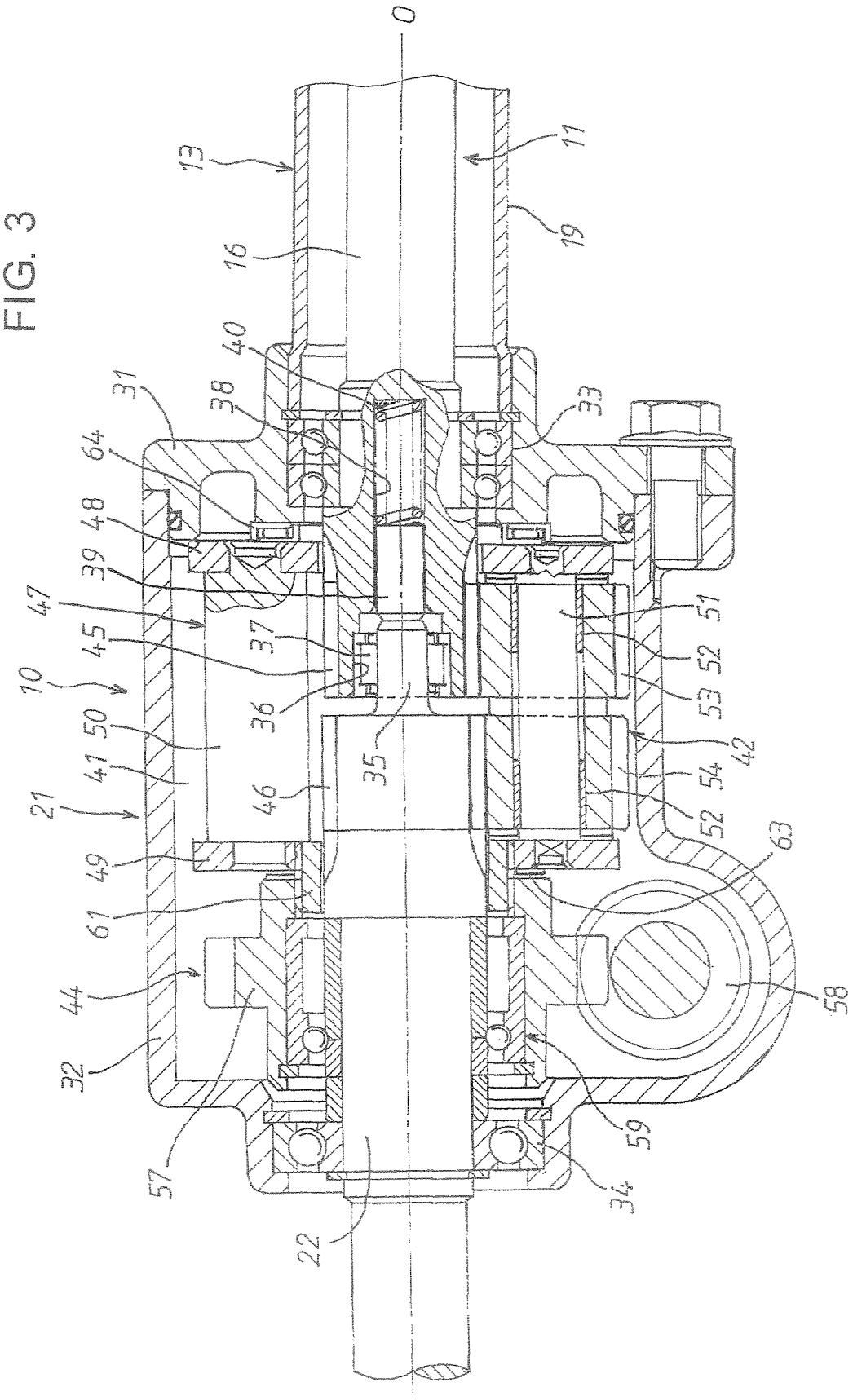

TRANSMISSION RATIO VARIABLE STEERING DEVICE

TECHNOLOGICAL FIELD

The present invention relates to a steering device for transmitting the rotation of a steering wheel shaft to steerable wheels through a steering mechanism and in particular, to a transmission ratio variable steering device capable of making the transmission ratio to the steering mechanism variable by a planetary gear mechanism.

BACKGROUND ART

It is often the case to make the transmission ratio steering wheel rotation/output shaft rotation) to a steering mechanism smaller for sharp handling when turn angle of a steering wheel is small, to make the transmission ratio larger for easy manipulation when the turn angle becomes large, and on the contrary, to make the transmission ratio to the steering mechanism larger for stability in neutral position of the steering wheel when the turn angle of the steering wheel is small. Further, it is the case in garaging to make the transmission ratio small considerably so that the turn angle of the steering wheel can be enough to be small. To cope with these cases, a transmission ratio variable mechanism which is capable of making the transmission ratio to the steering mechanism variable has come to be put into practical use.

By the way, the provision of the transmission ratio variable mechanism on a steering column brings advantages in the respects that there is not required any particular space for the mounting and that the incorporation of the transmission ratio variable mechanism can be realized without changing the construction of the steering mechanism. Regarding a transmission ratio variable mechanism of this kind, there has been known a technology described in Japanese Unexamined, Published Patent Application No. 2003-237590.

In the technology described in Japanese Unexamined, Published Patent Application No. 2003-237590, because with the rotation of the steering wheel, a motor built in a housing of the transmission ratio variable mechanism has to be rotated together with the steering wheel shaft, there is required a spiral cable which allows the motor itself to rotate while supplying electric signals to the motor. For this reason, the transmission ratio variable mechanism in the prior art not only needs an extra space, but also entails a risk of having a drawback such as the breakage of the cable wires.

The present invention has been made in order to solve the foregoing drawback and is intended to provide a transmission ratio variable steering device which is space-saving by eliminating a spiral cable and by arranging a motor on a housing attached to a steering column, at right angles to the axial direction of a steering wheel shaft.

DISCLOSURE OF THE INVENTION

A first invention is a steering device for transmitting the steering force acting on a steering wheel to steerable wheels through a steering mechanism and comprises a housing attached to a steering column; a steering wheel shaft rotatably supported in the housing and connected to the steering wheel side; an output shaft rotatably supported in the housing on the same axis as the steering wheel shaft and connected to the steering mechanism side; a planetary gear mechanism composed of first and second sun gears formed at facing end portions of the steering wheel shaft and the output shaft and different slightly in the number of gear teeth, a carrier supported rotatably about a center axis for the steering wheel shaft and the output shaft, and first and second planetary gears supported on the carrier and meshing respectively with the first and second sun gears; a worm wheel rotatably supported on any one of the steering wheel shaft and the output shaft and rotationally engaged with the carrier; a worm shaft meshing with the worm wheel; and a motor mounted on the housing in a direction perpendicular to the rotational axis of the steering wheel shaft and the output shaft and connected to the worm shaft.

According to the first embodiment, since the motor is provided on the housing attached to the steering column, advantages can be attained in that a spiral cable as provided in the prior art becomes unnecessary and that a transmission ratio variable steering device is obtained which is space-saving and can hardly have a drawback. In addition, since the motor is arranged in the direction perpendicular to the steering wheel shaft, the length of the transmission ratio variable steering device in the axial direction of the column can be shortened, the mounting of a shock absorbing mechanism can be easily realized even where the same is provided on the steering column, and the mounting becomes possible also in a light vehicle in which the entire length of a column shaft is short.

A second invention is the transmission ratio variable steering device in the first invention wherein the steering wheel shaft is supported by the housing through a double row bearing, and wherein the output shaft is supported by the housing through a single row bearing and has an end portion thereof fitted and supported in an end portion of the steering wheel shaft to be relatively rotatable.

According to the second invention, since the steering wheel shaft is supported by the double row bearing, the steering wheel shaft can be prevented from being inclined relative to the housing even when a side force is exerted on the sun gears, so that the meshing of the first and second sun gears with the plurality of first and second planetary gears can be maintained equally. This achieves an advantage that the fluctuation of the steering torque during the rotation of the steering wheel can be suppressed to secure a smooth steering feeling. Additionally, with respect to the output shaft, since one end thereof is supported by the steering wheel shaft, the straightness thereof can be secured by being supported relative to the housing through the single row bearing only.

A third invention is the transmission ratio variable steering device in the second invention, wherein a small-diameter portion is formed on the output shaft to protrude toward the steering wheel shaft and wherein the small-diameter portion is fitted and supported in a bearing hole formed in the steering wheel shaft through a bearing.

According to the third invention, since it can be realized to make a fitting and supporting portion for the steering wheel shaft and the output shaft come close to the double row bearing, securing the straightness of the output shaft can be further ensured.

BRIEF DESCRIPTION OF THE DRAWINGS

FIG. 2 is a sectional view taken along the line A-A in FIG. 1. FIG. 3 is a sectional view showing the specific construction of the transmission ratio variable steering device relating to the embodiment according to the present invention.

PREFERRED EMBODIMENT TO PRACTICE THE INVENTION

Figure 1:
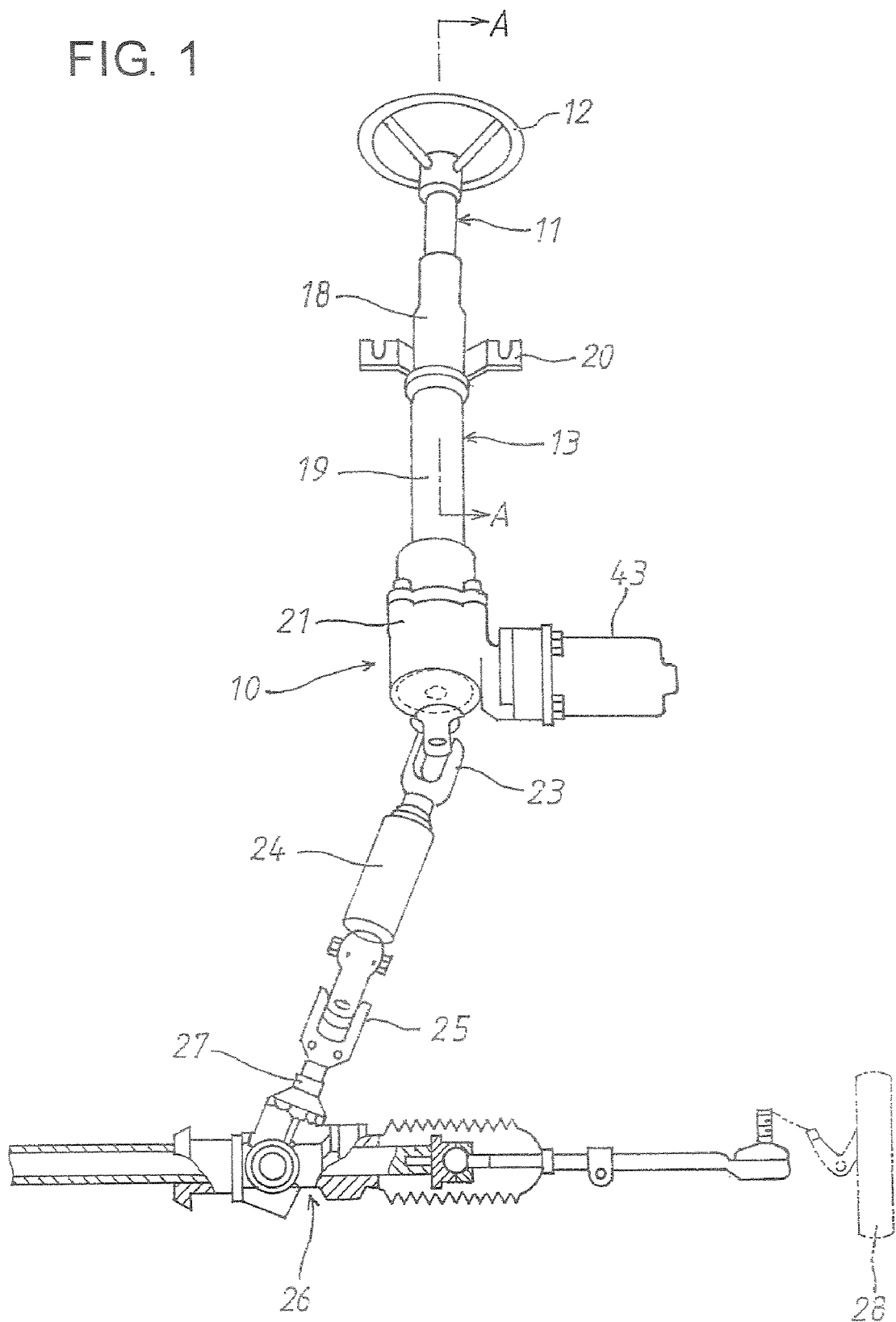
FIG. 1 is an exterior view of a steering column section mounting a transmission ratio variable steering device in an embodiment according to the present invention.

Hereafter, a transmission ratio variable steering device 10 relating to the embodiment according to the present invention will be described with reference to the drawings.

In FIG. 1 and FIG. 2, a numeral 11 denotes a steering wheel shaft with a steering wheel 12 attached to the top end thereof, and the steering wheel shaft 11 is rotatably supported in the steering column 13. The steering wheel shaft 11 is composed of an upper shaft 14 with the steering wheel 12 attached thereto and a lower shaft 16 fitted in a cylindrical portion 15 provided at the lower end portion of the upper shaft 11 with the relative rotation being restricted and with the relative displacement in the axial direction being allowed when an axial force exceeding a predetermined value is exerted thereon. Therefore, when a thrust force exceeding the predetermined value in the axial direction acts on the steering wheel shaft 11 as a result of the driver striking the steering handle 12 at the time of a collision, the upper shaft 14 is axially displaced forward relative to the lower shaft 16 thereby to absorb the shock energy.

The steering column 13 is composed of a cylindrical upper column 18 supporting the upper shaft 14 rotatably through a bearing 17 and a cylindrical lower column 19 fitted at its upper end portion in the internal surface of the lower end portion of the upper column 18. A numeral 20 denotes an upper portion bracket attaching the upper column 18 to a vehicle body, and the upper portion bracket 20 is constructed so that when the upper column 18 is moved forward with a shock at the time of a collision, the upper portion bracket comes off the vehicle body and allows the upper column 18 and the upper shaft 14 to move forward.

A housing 21 constituting a main body of the transmission ratio variable steering device 10 is secured to the lower end of the lower column 19. As shown in FIG. 3, the housing 21 supports respective end portions of the lower shaft 16 and an output shaft 22 to be rotatable or the same axis. The output shaft 22 is connected to an input shaft 27 of a rack-pinion type steering mechanism 26 through a universal joint 23, an intermediate shaft 24 and a universal joint 25, and steerable wheels 28 of the vehicle are steered toward left and right upon rotation of the input shaft 27.

Next, the specific construction of the transmission ratio variable steering device 10 will be described with reference to FIG. 3. The housing 21 of the transmission ratio variable steering device 10 is composed of an upper housing 31 and a lower housing 32, and the upper housing 31 is fixedly fitted on the lower end outer surface of the lower column 19 of the steering column 13, while the lower housing 32 is jointed by means of bolts to the upper housing 31. The upper housing 31 supports the lower shaft 16 of the steering wheel shaft 11 rotatably through a double row ball bearing 33, and the lower housing 32 supports the output shaft 22 connected to the steering mechanism 26 side, rotatably through a single row ball bearing 34 on the same axis as the lower shaft 16. With respect to "double row bearing" referred to in the present invention, a plurality of single row ball bearings 33 are used in juxtaposition as shown in FIG. 3, and besides, there may be used a double row ball bearing wherein plural rows of balls are provided on a common race.

The shaft end of the lower shaft 16 and the shaft end of the output shaft 22 are arranged within the lower housing 32 in a face-to-face relation with each other, and a small-diameter portion 35 is protruded from the shaft end of the output shaft 22. A bearing hole 36 is formed in the shaft end of the lower shaft 16, and the small-diameter portion 35 is supported in the bearing hole 36 rotatably through a needle roller bearing 37. In this manner the facing shaft end portions of the steering wheel shaft 11 and the output shaft 22 are mutually fitted and supported to be relatively rotatable through the bearing 37 for supporting a load in radial directions, with a high coaxiality about the rotational axis O being secured.

Here, regarding respective distances from a fitting and supporting portion for the steering wheel shaft 11 and the output shaft 22 to a bearing support portion (33) for the steering wheel shaft 11 and to a bearing support portion (34) for the output shaft 22, the distance on the steering wheel shaft 11 side is overwhelmingly shorter. Thus, by supporting the steering wheel shaft 11 on the side shorter in distance through the double row bearing 33, it can be realized to effectively suppress the shaft inclination caused by gear meshing resistance referred to later. In addition, by supporting the output shaft 22 on the side longer in distance through the single row bearing 34, it becomes easier to adjust the alignment with the steering wheel shaft 11, and two point supports together with the fitting and supporting portion ensure that the straightness can be kept well.

In the shaft end portion of the lower shaft 16 of the steering wheel shaft 11, a sliding hole 38 is formed to be continued to the bearing hole 36, and a friction member 39 is fitted slidably in the sliding hole 38 and is pressured by the resilient force of a compression spring 40 against the end surface of the small-diameter portion 35.

A planetary gear chamber 41 is formed in the lower housing 32, and a planetary gear mechanism 42 and a carrier revolver mechanism 44 are juxtaposed on the rotational axis O in the planetary gear chamber 41. The carrier revolver mechanism 44 is rotationally driven by a motor 43 provided on the lower housing 32. First and second sun gears 45, 46 which are slightly different in the number of gear teeth for constituting the planetary gear mechanism 42 are provided respectively on the facing shaft end portions of the lower shaft 16 and the output shaft 22. A pair of plates 48 and 49 which are spaced for constituting a carrier 47 are loosely fitted on the lower shaft 16 and the output shaft 22, and the pair of plates 48, 49 are united as one body by a plurality (e.g., three) of connection shafts 50 arranged in the circumferential direction. Further, between the pair of plates 48 and 49 and between the connecting shafts 50, a plurality of support shafts 51 are arranged in the circumferential direction and are secured at their opposite ends to the plates 48, 49. The support shaft 51 supports the first and second planetary gears 53, 54 rotatably respectively through bushes 52. The first and second planetary gears 53, 54 are bodily jointed and are in meshing respectively with the first and second sun gears 45, 46. The plates 48, 49, the connecting shafts 50 and the like constitute the carrier 47 which supports the first and second planetary gears 53, 54. The numbers of the gear teeth of the first and second sun gears 45, 46 and the first and second planetary gears 53, 54 are set to be respectively 20, 21, 21 and 20 as an example.

The carrier revolver mechanism 44 is constructed so that it transmits the rotational power of the motor 42 provided on the lower housing 32 to the carrier 47 to drivingly rotate the carrier 47. That is, the carrier revolver mechanism 44 is provided with a worm wheel 57 which is supported on the outer surface of the output shaft 22 through a bearing 59 to be restricted in the axial movement and to be rotatable and a worm shaft 58 meshing with the worm wheel 57, and the worm shaft 58 is supported at its opposite ends in the lower housing 32 through bearings (not shown) rotatably about an axis perpendicular to the rotational axis O. The motor 43 is mounted on the lower housing 32 to put its output shaft in axial alignment with the worm shaft 58, and the worm shaft 58 is operationally coupled to the output shaft of the motor 43.

A spline sleeve 61 with spline protrusions formed at its outer surface is fitted also on the output shaft 22. The spline sleeve 61 is inserted into the internal surfaces of the worm wheel 57 and one of the plates 49 of the carrier 47 and is in spline engagements with spline holes formed on the internal surfaces of the worm wheel 57 and the plate 49. Thus, the rotation of the worm wheel 57 is transmitted to the carrier 47 through the spline sleeve 61.

Since in this manner the motor 43 is mounted on the housing 21 (lower housing 32) attached to the steering column 13 (lower column 19), the position of the motor 43 is fixed (relative to the vehicle body) regardless of the rotation of the steering wheel shaft 11, so that it is unnecessary to use a spiral cable as provided in the prior art. Further, by arranging the motor 43 for driving the carrier revolver mechanism 44, in the direction normal to the rotational axis O, the motor 43 does not protrude in the lengthwise direction of the steering column 13, and thus, it becomes possible to mount the transmission ratio variable steering device 10 on the steering column 13 in a space-saving manner, so that restrictions on the assembling of the same device 10 can be made to be few.

Further, in FIG. 3, a numeral 63 denotes a washer spring interposed between the worm wheel 57 and the carrier 47, and the carrier 47 is pressured by the resilient force of the washer spring 63 in the direction of the rotational axis O, whereby the carrier 47 is kept in contact with an inner end surface of the upper housing 31 through a thrust bearing 64.

Next, the operation of the embodiment as constructed above will be described. When the steering wheel 12 is turned, the steering wheel shaft 11 is rotated, and the rotation of the steering wheel shaft 11 is transmitted to the output shaft 22 through the planetary gear mechanism 42 and further, from the output shaft 22 to the steerable wheels 28 through the steering mechanism 26, whereby the steerable wheels 28 are steered.

In this case, since the carrier 47 rotatable bodily with the worm wheel 57 is held fixed in the state that the rotation of the motor 43 is stopped, the first and second planetary gears 53, 54 are turned only on the axis thereof regardless of the rotations of the first sun gear 45 on the input side and the second sun gear 46 on the output side, and thus, the transmission ratio is held at a predetermined value, whereby the rotation of the steering wheel shaft 11 is transmitted to the output shaft 22 in a relation of about 1 to 1.

When in this state, the motor 43 is controlled by an electronic control unit to rotate so that the transmission ratio becomes optimum in dependence on the traveling state of the vehicle, the rotation of the motor 43 is transmitted to the worm shaft 58 to bodily rotate the worm wheel 47 and the carrier 47. By controlling the rotational speed and the rotational direction of the carrier 47 in dependence on the turn angle of the steering wheel, it can be realized that the ratio of the rotation of the output shaft 22 to the rotation of the steering wheel shaft 11, that is, the transmission ratio to the steering mechanism 26 can be controlled optimally in dependence on the traveling state of the vehicle.

By the way, since the steering wheel shaft 11 is supported by the double row bearing 33, the steering wheel shaft 11 can be prevented from being inclined even when a side force is exerted on the first sun gear 45 with the operation of the planetary gear mechanism 42. Further, since the output shaft 22 supported by the single row bearing 34 also has its one end supported at the shaft end portion of the steering wheel shaft 11, the straightness of the output shaft 22 can be secured though the same is supported by the single row bearing. Therefore, it becomes possible to equally keep the meshing of the first and second sun gears 45, 46 with the plurality of first and second planetary gears 53, 54.

In the foregoing embodiment, when the output shaft 22 is rotated by the steering wheel shaft 11 through the planetary gear mechanism 42, the friction member 39 received in the steering wheel shaft 11 side acts as resistance against the relative rotation between the steering wheel shaft 11 and the output shaft 22 because of being pressured by the resilient force of the compression spring 40 on the small-diameter portion 35 of the output shaft 22. This serves to reduce a play due to the gear backlash thereby improving the steering feeling and to enhance the rigidity in the neutral position of the steering wheel.

Further, although in the foregoing embodiment, description has been made regarding the example that the lower shaft 16 side of the steering wheel shaft 11 is supported by the double row bearing 33 and that the output shaft 22 side is supported by the single row bearing 34, it may be possible on the contrary to support the output shaft 22 side by the double row bearing and to support the lower shaft 16 side by the single row bearing. In this case, it is desirable that the planetary gear mechanism 42 and the carrier revolver mechanism 44 are reversed in arrangement to shorten the distance from the fitting and supporting portion for the output shaft 22, supported by the double row bearing, and the lower shaft 16 to the double row bearing.

Further, the steering mechanism 26 applicable to the transmission ratio variable steering device according to the present invention may be any of electric power steering mechanisms and hydraulic power steering mechanisms and may of course be manual steering mechanisms without being limited necessarily to power steering mechanisms.

INDUSTRIAL APPLICABILITY

The transmission ratio variable steering device according to the present invention is suitable for application to a steering system which transmits the rotation of a steering wheel of a motor car to steerable wheels at a variable transmission ratio.

The invention claimed is:

1. A transmission ratio variable steering device for transmitting the steering force acting on a steering wheel to steerable wheels through a steering mechanism, the device comprising a housing attached to a steering column;

a steering wheel shaft rotatably supported in the housing and connected to the steering wheel side, wherein the steering wheel shaft is supported by the housing through a double row bearing;

an output shaft rotatably supported in the housing on the same axis as the steering wheel shaft and connected to the steering mechanism side, wherein the output shaft is supported by the housing through a single row bearing and has an end portion thereof fitted and supported in an end portion of the steering wheel shaft to be relatively rotatable;

a planetary gear mechanism composed of first and second sun gears formed at facing end portions of the steering wheel shaft and the output shaft and different slightly in the number of gear teeth, a carrier supported rotatably about a center axis for the steering wheel shaft and the output shaft, and first and second planetary gears supported on the carrier and meshing respectively with the first and second sun gears;

a worm wheel rotatably supported on any one of the steering wheel shaft and the output shaft and rotationally engaged with the carrier; a worm shaft meshing with the worm wheel; and a motor mounted on the housing in a direction perpendicular to the rotational axis of the steering wheel shaft and the output shaft and connected to the worm shaft.

2. The transmission ratio variable steering device in claim 1, wherein a small-diameter portion is formed on the output shaft to protrude toward the steering wheel shaft and wherein the small-diameter portion is fitted and supported in a bearing hole formed in the steering wheel shaft through a bearing.

* * * * *